(12) United States Patent
Edmark et al.

(10) Patent No.: US 6,819,267 B1
(45) Date of Patent: Nov. 16, 2004

(54) SYSTEM AND METHOD FOR PROXIMITY BOOKMARKS USING GPS AND PERVASIVE COMPUTING

(75) Inventors: Ronald O'Neal Edmark, Austin, TX (US); Riaz Y. Hussain, Austin, TX (US); Donald Lawrence Mulvey, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 09/584,937

(22) Filed: May 31, 2000

(51) Int. Cl.$^7$ ............................................. G08G 1/123
(52) U.S. Cl. ...................................... 340/988; 709/203
(58) Field of Search ...................... 340/988; 455/186.1; 709/203, 206

(56) References Cited

U.S. PATENT DOCUMENTS

| | | | |
|---|---|---|---|
| 5,392,052 A | 2/1995 | Eberwine .................... | 342/357 |
| 5,528,248 A | 6/1996 | Steiner et al. .............. | 342/357 |
| 5,614,913 A | 3/1997 | Nichols et al. ............. | 342/357 |
| 5,699,244 A | 12/1997 | Clark, Jr. et al. ........... | 364/420 |
| 5,790,974 A | 8/1998 | Tognazzini ................. | 701/204 |
| 5,938,721 A | 8/1999 | Dussell et al. .............. | 701/211 |
| 5,948,040 A | 9/1999 | DeLorme et al. .......... | 701/201 |
| 6,182,113 B1 * | 1/2001 | Narayanaswami .......... | 709/203 |
| 6,392,548 B2 * | 5/2002 | Farringdon et al. ....... | 340/573.1 |
| 6,578,047 B1 * | 6/2003 | Deguchi ................... | 707/104.1 |
| 6,650,877 B1 * | 11/2003 | Tarbouriech et al. .... | 455/186.1 |

FOREIGN PATENT DOCUMENTS

JP      11108685     9/1997     .......... G01C/21/00

OTHER PUBLICATIONS

Spohrer, J. C., "Information in Places," *IBM Systems Journal*, vol. 38, No. 4, 1999 (p. 602–628).

* cited by examiner

Primary Examiner—John Tweel
(74) Attorney, Agent, or Firm—Joseph T. Van Leeuwen; Leslie A. Van Leeuwen

(57) ABSTRACT

A system and method for activating bookmark files on a pervasive computing device is provided. When the pervasive computing device receives geographic coordinates from a global positioning system (GPS), it selects appropriate bookmarks for the user's location. The pervasive computing device compares geographic coordinate data received from the GPS with geographic matching data stored on the pervasive computing device. In addition, actions are taken to perform commands when the user is within the proximity of a location. Scheduling means are provided so that actions are performed during appropriate times. The pervasive computing device further connects to a computer network, such as the Internet, to access data files and to perform commands on external computing devices. If the commands are executed successfully, a success action is performed on the pervasive computing device. On the other hand, if errors were encountered a failure action is performed notifying the user of the error. Further disclosed are a system and a computer program product each providing active geographic-based bookmarks.

20 Claims, 6 Drawing Sheets

SYSTEM AND METHOD FOR PROXIMITY BOOKMARKS USING GPS AND PERVASIVE COMPUTING

BACKGROUND OF THE INVENTION

1. Technical Field

The present invention relates in general to a method and system for data processing and in particular to an improved method and system of activating bookmarks based upon the location of a user. Still more particularly, the present invention relates to an improved method and system for performing commands based upon the user's location and, alternatively, the time of day.

2. Description of the Related Art

Pervasive computing devices are available to perform a wide variety of tasks in today's business arena. Semiconductor technology has enabled devices from telephones and personal computers to refrigerators and household appliances to better assist people in their daily activities. Cellular telephones, for example, can not only be used to place telephone calls but can also be used to access the Internet, check stock quotes and sports scores, and act as a personal digital assistant (or PDA). Personal computer systems are also becoming smaller, more portable, as well as more powerful.

In turn with technology, the modern business environment has become more competitive and more complex. The modern business environment entails more traveling than previously needed. Business markets are more often global, rather than regional, in nature because of technology that allows businesses to provide goods and services to customers regardless of the customers' location. Business customers are consequently located in vast areas, often quite distant from the organization's main facility. The advent of the Internet facilitates even small home-based businesses to have a global presence for minimal cost. Business people frequently travel to customers to provide service and increase sales. While advances in transportation have not kept pace with computer technology, it is still possible to take a commercial airline or drive considerable distances in a short amount of time.

To assist travelers, a global positioning system (GPS) has been developed to inform the traveler of his or her exact location. Located hundreds of miles above the earth, GPS uses satellites to triangulate a traveler's location and determine the exact location of the traveler on the earth within a few feet. GPS devices have been developed and placed in automobiles, airplanes, and hand-held devices to assist people while traveling across the earth. The devices determine the distance from satellites and triangulate the data to determine a geographic coordinate. Devices can then transpose other known structures, such as highways, cities, and points of interest to orient the user using a graphical display.

While a traveler may know his or her exact geographic, location, a challenge with the current art is communicating the geographic data to the traveler's pervasive computing device to further assist the traveler while on the road. As mentioned before, pervasive computing devices often have access to the Internet. Internet users often browse the information available on the Internet using a World Wide Web browser ("web browser"). Examples of web browsers include Microsoft's Internet Explorer™ and Netscape's Navigator™ and Communicator™ products.

To make the Internet easier to use, users often save links to their favorite web sites in bookmark files. Bookmark files contain a list of web sites that the user saves along with the Internet Protocol (IP) address of the site. Bookmark files may become large depending on the number of links the user has saved. Bookmarks can also be received from other users by importing the bookmarks from an external file into a bookmark file on the user's pervasive computing device. Because bookmark files may become large, they are often organized into sections, or folders, similar to organizing papers in a filing cabinet. For example, if a user enjoys movies, he or she may organize several movie-related bookmarks into a movie folder. When the user wants to go to a movie site, he or she selects the movie folder. If the user travels, he or she may wish to create sub-folders containing local movie information for particular cities that the user frequently visits. A challenge with the current art is presenting geographically-oriented data to the user based upon the user's present location.

An additional use of pervasive computing devices is scheduling appointments and keeping track of contacts using a PDA. A challenge of the current art, however, is dynamically suggesting changes to the schedule based upon the user's present location. For example, the user may be driving close to a customer's location on his or her way to another customer's site. If sufficient time exists in the user's schedule, it would be make sense to visit the first customer. However, because of the wide-spread nature of many business markets, the user might not realize that he or she is geographically close to the first customer. A challenge with the current art is making logical connections between a user's current geographical location and the tasks the user is performing.

SUMMARY

It has been discovered that pervasive computing devices can read geographic coordinate data from a global positioning system and select geographically appropriate bookmark files. In this way, the user is presented with bookmarks relevant to the user's location, rather than having to manually search through bookmarks for sites related to a particular place. Additionally, a user's pervasive computing device automatically performs commands when the device is within a given proximity to a geographic location. For example, a salesperson's PDA can alert the user while traveling on a roadway that the salesperson is within a certain proximity to a customer's site.

Actions are performed if a proximity command is successful and alternative actions are performed by the pervasive computing device if the proximity command encountered an error or otherwise failed. For example, if a salesperson is within a certain proximity of a customer's site, the salesperson's pervasive computing device can access a map of the customer's location from the Internet and display the map for the user. The successful action would be the display of the map, while a message is displayed if the web site is down or the computing device is otherwise unable to retrieve a copy of the map.

Additionally, a computer network, such as the Internet, is accessible so that other computing devices can perform proximity commands as well as provide bookmark files to the user's pervasive computing device. In this manner, bookmark files are stored on nonvolatile storage devices accessible through the computer network. When a the user is at a certain geographic location, a set of bookmarks corresponding to the location are downloaded to the pervasive computing device and activated for use by the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the, description.

Figure 1:
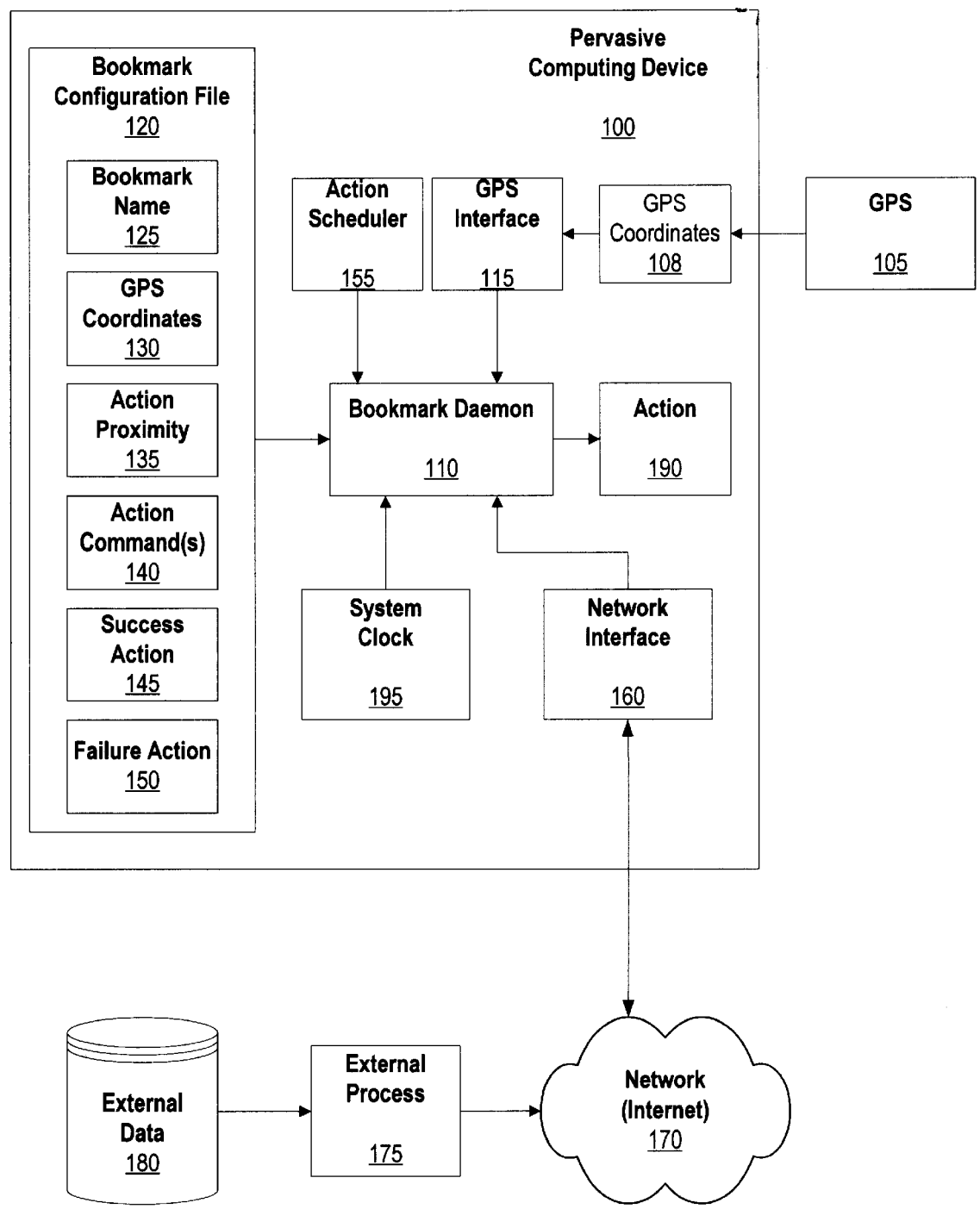
FIG. 1 is a block diagram of a pervasive computing device attached to a GPS and a computer network.

FIG. 1 shows a block diagram of pervasive computing device 100 activating geographic-specific bookmark files. GPS 105 provides GPS coordinates 108 to pervasive computing device 100. GPS 105 can be an external device to pervasive computing device 100 that provides GPS coordinate data through GPS interface 115. In a personal computer, GPS interface 115 may be a serial port using a serial cable to attach GPS 105 to pervasive computing device 100. In a PDA or cellular telephone, GPS interface 115 is customized to the PDA or cellular telephone with either a cable or wireless (i.e., infra-red) connection between GPS 105 and pervasive computing device 100. In another embodiment, GPS 105 is a device incorporated within pervasive computing device 100, eliminating the need for an external device. Providing an internal GPS 105 is preferred to increase portability of the device in applications such as cellular telephones and PDAs where the pervasive computing device 100 is often carried with the user.

GPS coordinates 108 are provided to bookmark daemon 110 for processing. Bookmark daemon 110 is a process running within pervasive computing device 100 that periodically receives coordinate data and determines which bookmark from bookmark configuration file 120 should be activated. Bookmark configuration file 120 includes data describing bookmarks used by pervasive computing device 100 and coordinate data describing when certain bookmark files are activated. Bookmark configuration file 120 includes bookmark name 125 for each bookmark maintained by bookmark configuration file 120. Bookmark name 125 is often a name assigned by the user or some other human-readable name that assists the user in identifying and selecting bookmarks.

Bookmark configuration file 120 also includes GPS matching coordinate data 130. GPS matching coordinate data 130 include the GPS coordinates used to activate the corresponding bookmark. Because GPS coordinate data is quite specific, identifying a point on the earth accurate to within a few feet, proximity information is needed to determine how close GPS coordinates 108 have to be to GPS matching coordinate data 130 before the corresponding bookmark is activated. Action proximity data 135 provides the amount of distance between GPS coordinates 108 and GPS matching coordinate data 130. For example, to activate a bookmark when the user is close to Dallas, Tex., GPS matching coordinate data 130 would be set at the center of the city. Action proximity data 135 would then be set at the distance from GPS matching coordinate data, for example 50 miles, that will activate the bookmark. Now, when the user is within a 50 mile radius of Dallas, the Dallas oriented bookmarks would be activated. Flexibility allows for some bookmarks to be set at a larger radius, or proximity, than other bookmarks. For example, a bookmark providing local radio station information may be set at a greater proximity, for example a 100 mile radius, while a bookmark of downtown restaurants may be customized to be activated only when the user is within a 10 mile radius of the center of the city.

In addition to activating bookmarks from bookmark configuration file. 120, pervasive computing device 100 can also be instructed to perform action commands 140 when the user is within the proximity of GPS matching coordinate data 130. Action commands 140 may include sounding an alarm, playing a sound (.wav) file, running a particular program on pervasive computing device 100, loading a particular web site (URL or Universal Resource Locator) on a web browser connected to the Internet (Network 170), querying a database either locally within pervasive computing device 100 or externally by connecting through network 170, downloading a file from a specified web site (FTP—File Transfer Protocol) connected to the Internet (Network 170), checking for email, sending a pager message, or any number of other activities.

For example, when a salesperson is within a certain proximity to a customer's office, action commands 140 can be instructed to display a pop-up message to the user, ask the user if he or she wishes to schedule an appointment, retrieve a map of the customer's location, or any number of activities that the user may wish to perform. If action commands 140 are performed successfully, success action 145 is performed. For example, if action command 140 was to retrieve a map of the customer's location, success action 145 may be to display the map on the display screen connected to pervasive computing device 100. On the other hand, if the map is unable to be retrieved, failure action 150 is performed. In the example above, failure action 150 may be to display a message that the user is a certain distance from the customer's office, but the map is unable to be retrieved.

To increase the range of action commands 140 and bookmark data available to pervasive computing device 100, network interface 160 is included in pervasive computing device 100 to allow the device to connect to other computers and resources. Network interface 160 may be a modem, a DSL connection, a cable modem, an ISDN connection, or any number of connection methods known today or developed in the future. In a portable pervasive computing device 100, network interface may be a wireless connection, such as a cellular modem, allowing the user to connect to network 170 while traveling. Network 170 is a computer network where information is digitally transferred between computers. Network 170 may be a private network accessible by employees of the organization, or may be a public network accessible by anyone. An example of a public computer network is the Internet. Network 170 allows pervasive computing device 100 to link to other pervasive computing devices, including servers and personal computer systems. External data 180 is provided to pervasive computing device 100 through external process 175 which provides the data back to pervasive computing device 100 through network 170. For example, graphical map data, such as a customer's site map, may be stored on a server connected to the Internet. It would be redundant and take storage space on pervasive computing device 100 to keep all maps and such data on nonvolatile storage directly attached to pervasive computing device 100. By connecting to network 170, the user could download the map and have the map displayed on the pervasive computing device 100 display screen. On the other hand, network availability depends on a number of factors, including network traffic and server availability. Important, or often used information, may be preferably stored on nonvolatile storage connected to pervasive computing device 100 accessible without the need of network 170.

Some action commands 140 may be time-sensitive in nature. For example, a customer's office may only be open on weekdays from 8:00 AM to 5:00 PM. If the user of pervasive computing device 100 was traveling at night or on a weekend, it would make little sense to try and schedule an appointment or otherwise contact the customer since the office is closed. Action scheduler 155 includes timing information that indicate when action commands 140 should be executed. Before executing action commands 140, bookmark daemon 110 compares the time from system clock 195 with timing data from action scheduler 155. If the current time from system clock 195 is within the limits set in action scheduler 155, action commands 140 are executed. On the other hand, if the current time from system clock 195 falls outside the limits set in action scheduler 155, action commands 140 are not executed. In one embodiment, bookmark daemon 110 periodically checks the current time to determine if the user is (1) still within the required proximity, and (2) the current time is within the limits set in action scheduler 155. In this way, if the user was staying overnight in an area near the customer's office, the next morning, action commands 140 would execute and ask the user if he or she wished to schedule an appointment or contact the customer.

Figure 2:
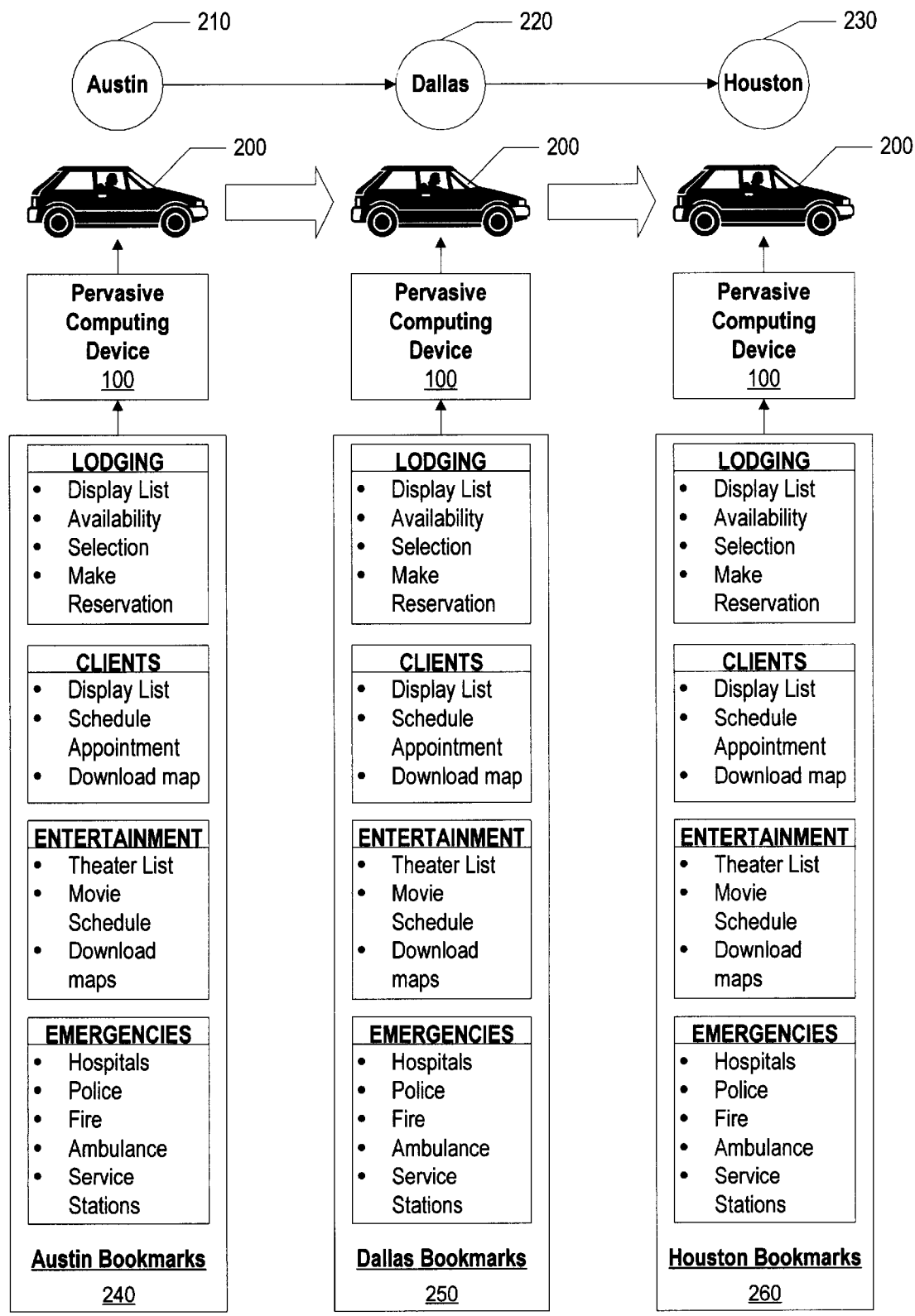
FIG. 2 is a diagram of a user traveling to various locations and the pervasive computing device automatically activating the corresponding bookmark files.

FIG. 2 shows a user traveling with pervasive computing device 100 to various cities in the state of Texas. When Austin proximity 210 is reached by the user traveling in automobile 200, Austin bookmarks 240 are activated and any action commands associated with any of the bookmarks are performed. As shown, examples of bookmarks may be broken down into various categories. Austin bookmarks 240 are shown as various sets of bookmarks including a set of lodging bookmarks. Lodging bookmarks contain a list of available lodging in the Austin area. The user can display the available lodging, along with availability and room selection. Action commands are also available to make a reservation for a room in the Austin area. The client's set of bookmarks includes action commands to display a list of nearby clients, schedule an appointment with one or more clients, and download maps for driving instructions to the client's location. The entertainment set of bookmarks includes displaying a theater listing, movie schedules of movies currently playing in the Austin area, and downloading maps with driving instructions to the Austin area theaters. A set of emergency contact bookmarks is also included for phone numbers and maps to Austin area hospitals, police departments, fire departments, and service stations.

When the user travels out of the Austin area and into Dallas proximity 220, pervasive computing device 100 activates Dallas bookmarks 250 with information about the Dallas environment as well as performing action commands similar to the action commands performed when the user was in Austin proximity 210. Likewise, when the user travels from Dallas proximity 220 to Houston proximity 230, Houston related bookmarks and action commands are activated and performed.

Figure 3:
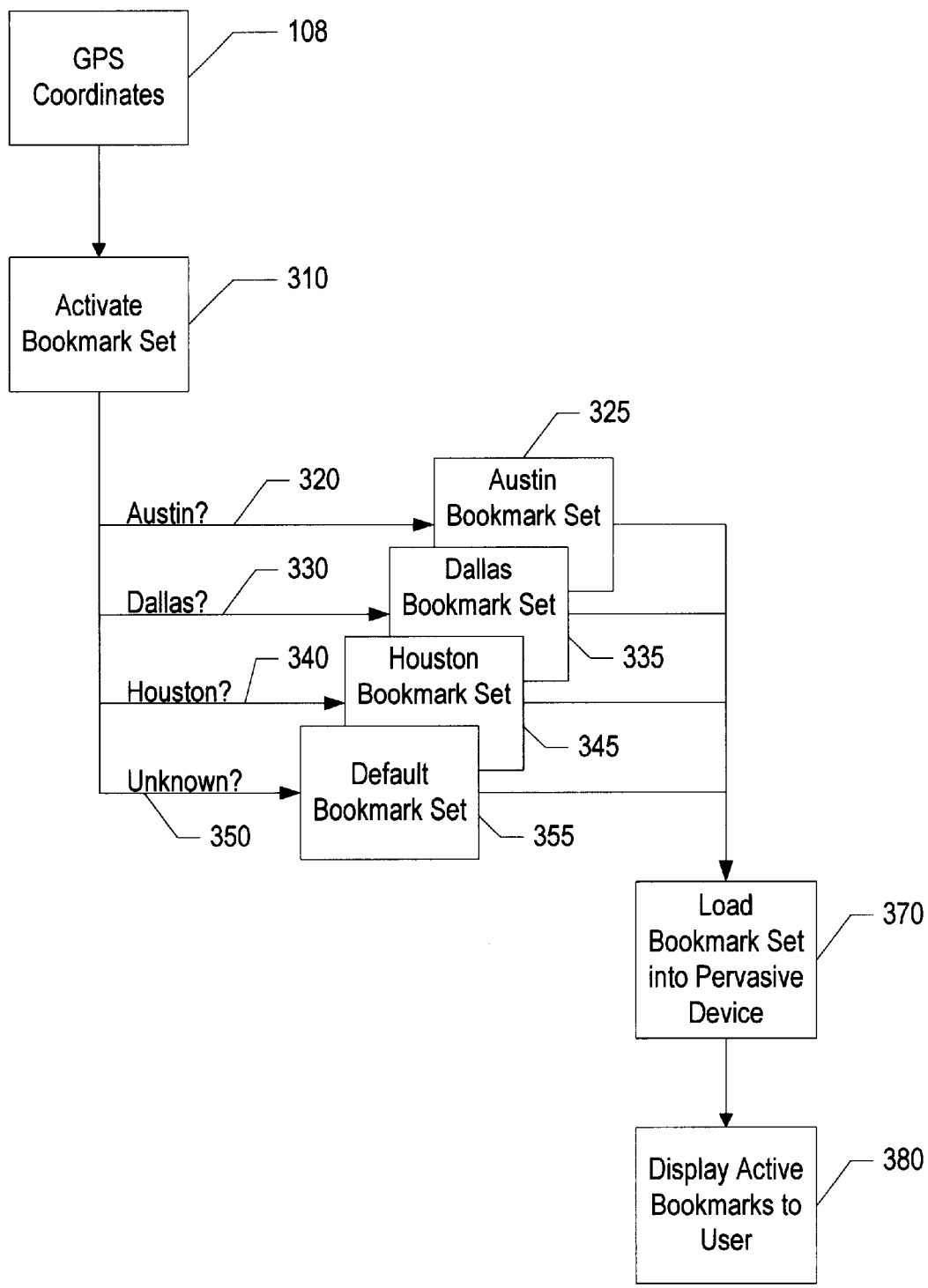
FIG. 3 is a high level flowchart showing bookmark sets being activated for a user.
Figure 4:
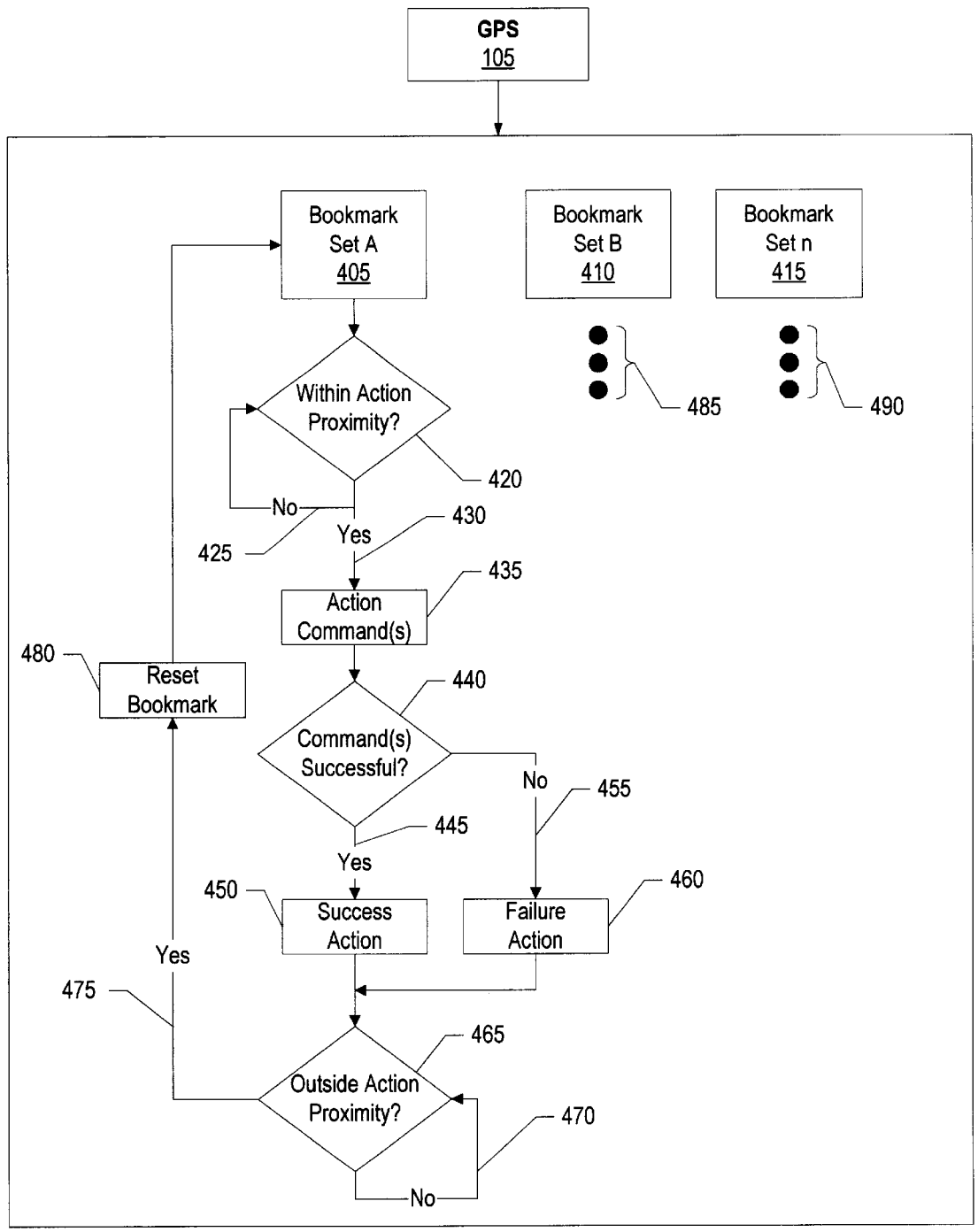
FIG. 4 is a flowchart of bookmark files being activated and performing proximity commands.

FIG. 3 shows a high level flowchart of the activities shown in FIGS. 2 and 4. GPS coordinates 108 are received and process 310 is executed to activate a bookmark set. If GPS coordinates 108 are within the Austin proximity, Austin branch 320 is taken whereupon Austin bookmark set 325 is read. The bookmark set that was read, in this case Austin, is loaded and activated into the pervasive computing device (step 370). Active bookmarks are displayed to the user (step 380) upon request. Likewise, if the user is within the Dallas or Houston proximities, branches 330 and 340 are respectively taken and the corresponding bookmark sets are read (Dallas 335, Houston 345). The bookmark files would be loaded into the pervasive computing device (step 370) and displayed upon request to the user (step 380). If GPS coordinates 108 do not fall within any predefined locations, unknown location branch 350 is taken whereupon default bookmark set 355 is activated.

Geographically oriented bookmarks may coexist with other bookmarks that are not geographically oriented. In addition, with use of greater proximity ranges, regional bookmarks can be established so that certain bookmarks are activated when the user is within the United States with additional bookmarks being activated when the user is in a particular city (i.e., Austin, Houston, or Dallas). A different set of regional bookmarks can be activated when the user is in Europe or Japan with additional bookmarks being activated when the user is within a particular European or Japanese city.

FIG. 4 shows a flowchart of bookmark sets receiving GPS coordinates 108. Bookmark Set A 405 receives the coordinates. The program determines whether GPS coordinates 108 are within the action proximity (decision 420). If GPS coordinates 108 are not within the action proximity, "no" branch 425 is taken looping back to decision 420. A sleep or pause can alternatively be programmed so that decision 420 is executed on a certain interval basis (e.g., every 5 minutes). If GPS coordinates 108 are within the action proximity, "yes" branch 430 is taken and action commands 435 are executed. Decision 440 determines whether action commands 435 were executed successfully. If action commands 435 were executed successfully, "yes" branch 445 is taken and success action 450 is performed (i.e., display a map). On the other hand, if action commands 435 were not executed successfully, "no" branch 455 is taken and failure action 460 is performed (i.e., display a message that customer is nearby but map is not available). When the user is no longer within the proximity area for Bookmark Set A 405, decision 465 branches to "yes" branch 475 and reset bookmark process 480 is performed. Reset bookmark process 480 deactivates Bookmark Set A and may restore default bookmarks or other bookmarks that were in place before Bookmark Set A was activated. If the user is still within the action proximity, decision 465 branches to "no" branch 470 which loops back to decision 465 until the user is outside the action proximity. A sleep or pause can alternatively be programmed so that decision 465 is executed on a certain interval basis (e.g., every 5 minutes).

Figure 5:
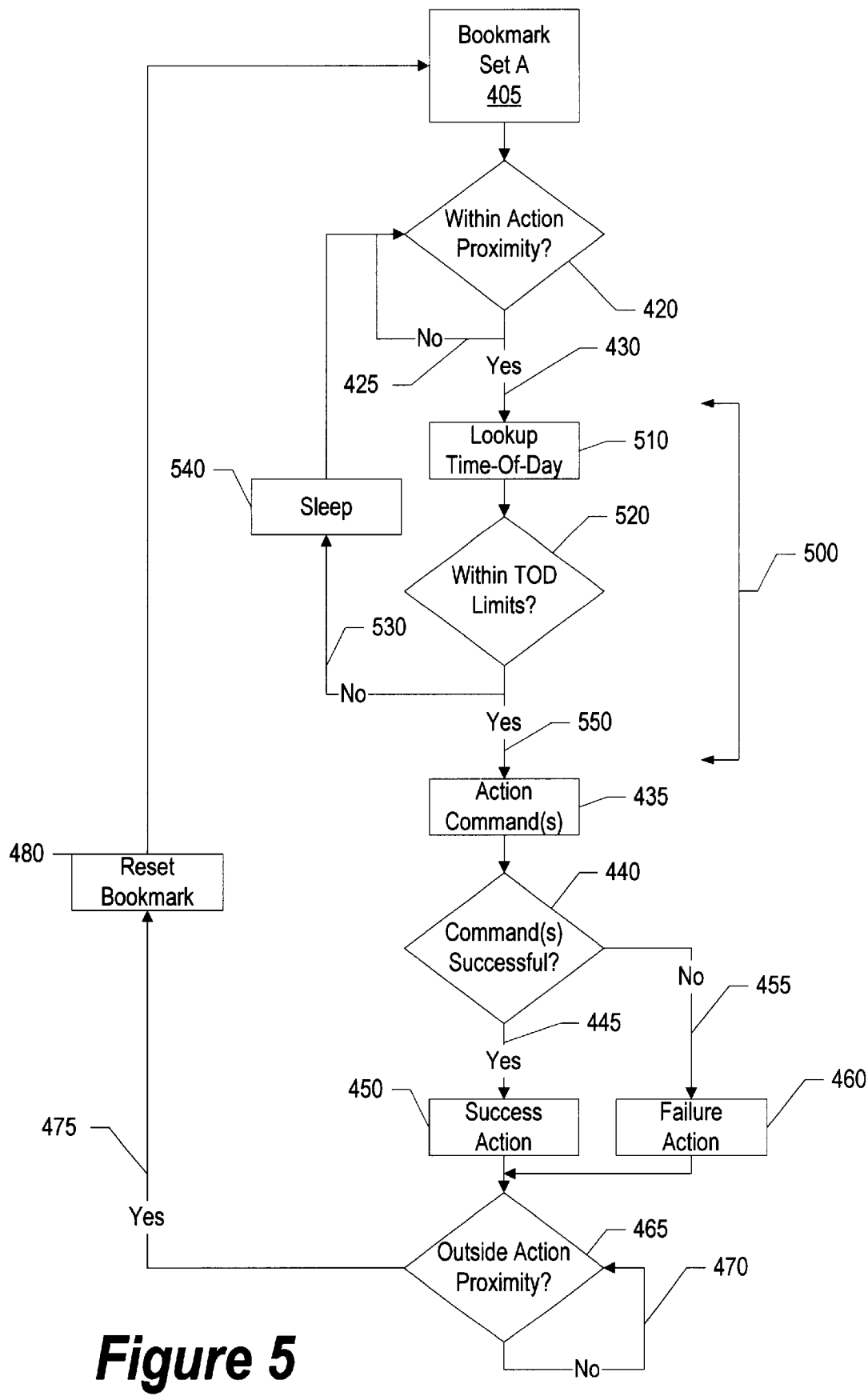
FIG. 5 is a flowchart of bookmark files being activated and proximity commands being executed based upon a command schedule and proximity data.

FIG. 5 shows the flowchart previously introduced in FIG. 4 with additional logic for handling scheduling criteria for action commands. Since some activities, for example contacting a customer, may only be appropriate on certain days on within certain hours of the day, time of day processing 500 is included to handle the scheduling of time-based action commands. After GPS coordinates 108 (shown in FIG. 4) are within the proximity required for Bookmark Set A 405, decision 420 branches to "yes" branch 430. Instead of immediately executing action commands 435, time of day processing 500 is performed. System clock 195 located within pervasive computing device 100 (see FIG. 1), is polled to determine the date and time of day (step 510). If the current time of day is outside the scheduling limits, "no" branch 530 is taken whereupon the process sleeps until the beginning of the time scheduled for the action (step 540) before looping back to decision 420 to determine whether GPS coordinates 108 (see FIG. 3) are still within the action proximity. If the GPS coordinates are within the action proximity, processing continues to performing action commands 435.

Figure 6:
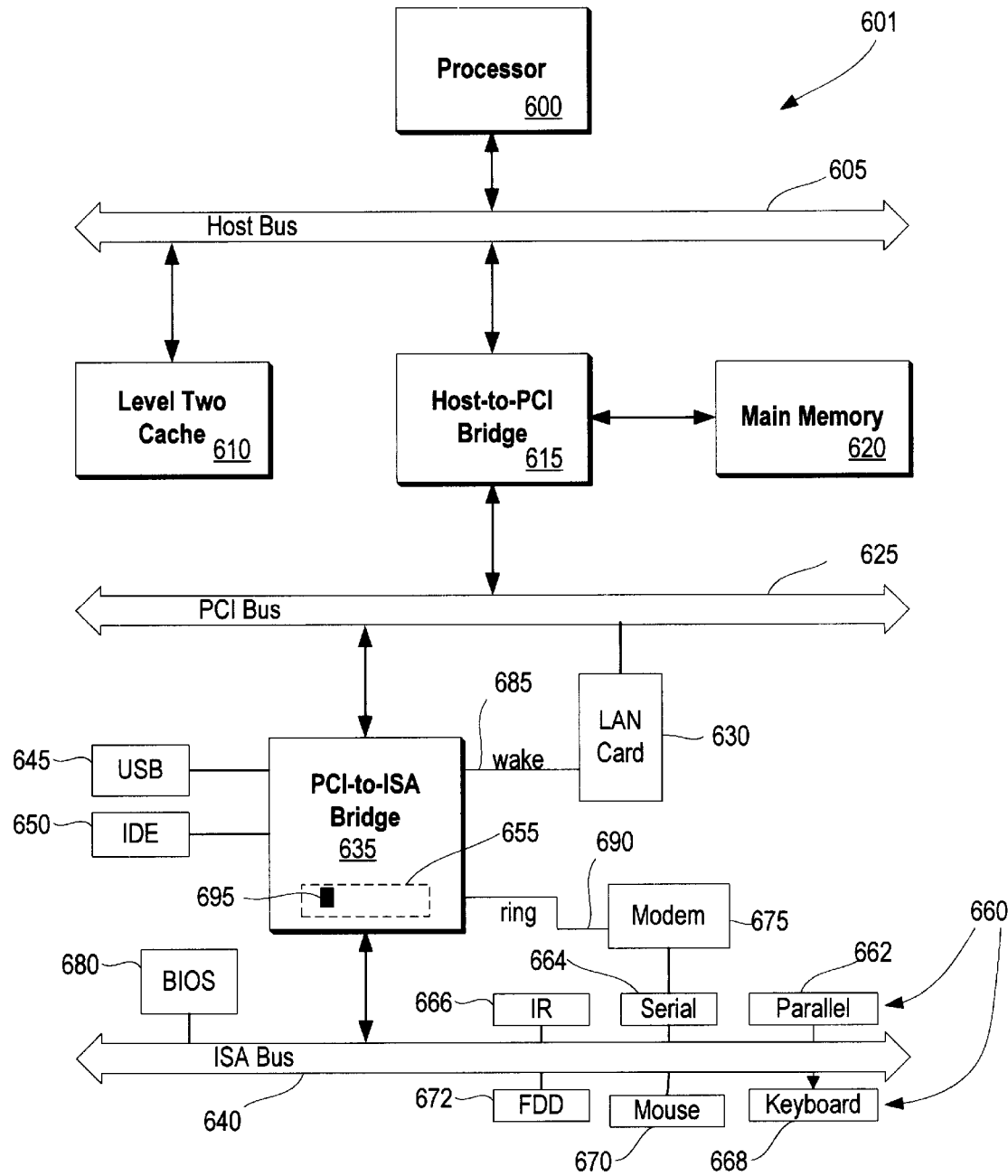
FIG. 6 is a block diagram of a pervasive computing device capable of implementing the bookmark selection and activation.

FIG. 6 illustrates, information handling system 601 which is a simplified example of a computer system capable of performing the copy processing described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (FDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 another computer system to copy files over a network, LAN card 630 is coupled to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for activating bookmark files, said method comprising:

receiving geographic coordinate data, the geographic coordinate data including global positioning data identifying a current location;

selecting one or more bookmark files corresponding to the geographic coordinate data; and activating the selected bookmark files in a computing device.

2. The method as described in claim 1 further comprising:

reading action proximity data, the action proximity data including geographic matching data; and wherein the selecting further includes comparing the geographic coordinate data to the geographic matching data.

3. The method as described in claim 1 further comprising:

executing one or more commands in response to the selecting.

4. The method as described in claim 3 further comprising:
performing a success action in response to a successful execution of the one or more commands.

5. The method as described in claim 3 further comprising:
performing a failure action in response to an unsuccessful execution of the one or more commands.

6. The method as described in claim 3 further comprising:
reading command execution schedule data;
comparing the command execution schedule data to a system clock; and
wherein the executing is selectively performed in response to the comparing.

7. The method as described in claim 1 further comprising:
attaching the computing device to a computer network.

8. The method as described in claim 7 further comprising:
executing a command on a second computing device connected to the computer network.

9. The method as described in claim 7 further comprising:
receiving at least one of the bookmark files from a second computing device attached to the computer network.

10. A computer system comprising:
a computer including:
one or more processors;
a nonvolatile storage device accessible by the one or more processors;
bookmark files stored on the nonvolatile storage device;
a global positioning system (GPS), the GPS providing geographic coordinate data read by the processors;
a bookmark activation tool, the bookmark activation tool including:
means for reading the geographic coordinate data provided by the GPS;
means for selecting one or more bookmark files corresponding to the geographic coordinate data; and
means for activating the selected bookmark files in the computer system.

11. The computer system as described in claim 10 further comprising:
action proximity data stored on the nonvolatile storage device, the action proximity data including geographic matching data;
wherein the bookmark activation tool includes:
means for comparing the geographic coordinate data provided by the GPS with the geographic matching data.

12. The computer system as described in claim 10 wherein the bookmark activation tool further includes: means for executing one or more commands in response to the means for selecting.

13. The computer system as described in claim 12 further comprising:
a system clock;
means for reading command execution schedule data;
means for comparing the schedule data to the system clock; and
wherein the means for executing operates responsively to the means for comparing.

14. The computer system as described in claim 10 further comprising:
a second computer, the second computer including one or more processors, a network interface and a memory;
a computer network connecting a network interface connected to the computer to the network interface connected to the second computer;
means for executing a command on the second computer in response to the geographic coordinate data.

15. The computer system as described in claim 13 further comprising:
means for receiving at least one of the bookmark files from the second computer through the computer network.

16. A computer program product stored on a computer usable medium for activating bookmark files, said computer program product comprising:
means for receiving geographic coordinate data, the geographic coordinate data including global positioning data identifying a current location;
means for selecting one or more bookmark files corresponding to the geographic coordinate data; and
means for activating the selected bookmark files in a computing device.

17. The computer program product as described in claim 16 further comprising:
means for reading action proximity data, the action proximity data including geographic matching data; and
wherein the means for selecting further includes means for comparing the geographic coordinate data to the geographic matching data.

18. The computer program product as described in claim 16 further comprising:
means for executing one or more commands in response to the means for selecting.

19. The computer program product as described in claim 18 further comprising:
means for reading command execution schedule data;
means for comparing the command execution schedule data to a system clock; and
wherein the means for executing is selectively performed in response to the means for comparing.

20. The computer program product as described in claim 16 further comprising:
means for attaching the computing device to a computer network;
means for executing a command on a second computing device connected to the computer network; and
means for receiving at least one of the bookmark files from the second computing device attached to the computer network.

* * * * *

UNITED STATES PATENT AND TRADEMARK OFFICE
CERTIFICATE OF CORRECTION

PATENT NO. : 6,819,267 B1
DATED : November 16, 2004
INVENTOR(S) : Edmark et al.

It is certified that error appears in the above-identified patent and that said Letters Patent is hereby corrected as shown below:

Column 1,
Line 56, please delete "geograpic," and insert -- geographic --.

Column 4,
Line 29, please delete "file." and insert -- file --.

Column 7,
Line 26, please delete "illustrates," and insert -- illustrates --.

Signed and Sealed this

Fifteenth Day of March, 2005

JON W. DUDAS
*Director of the United States Patent and Trademark Office*